Figure 1:
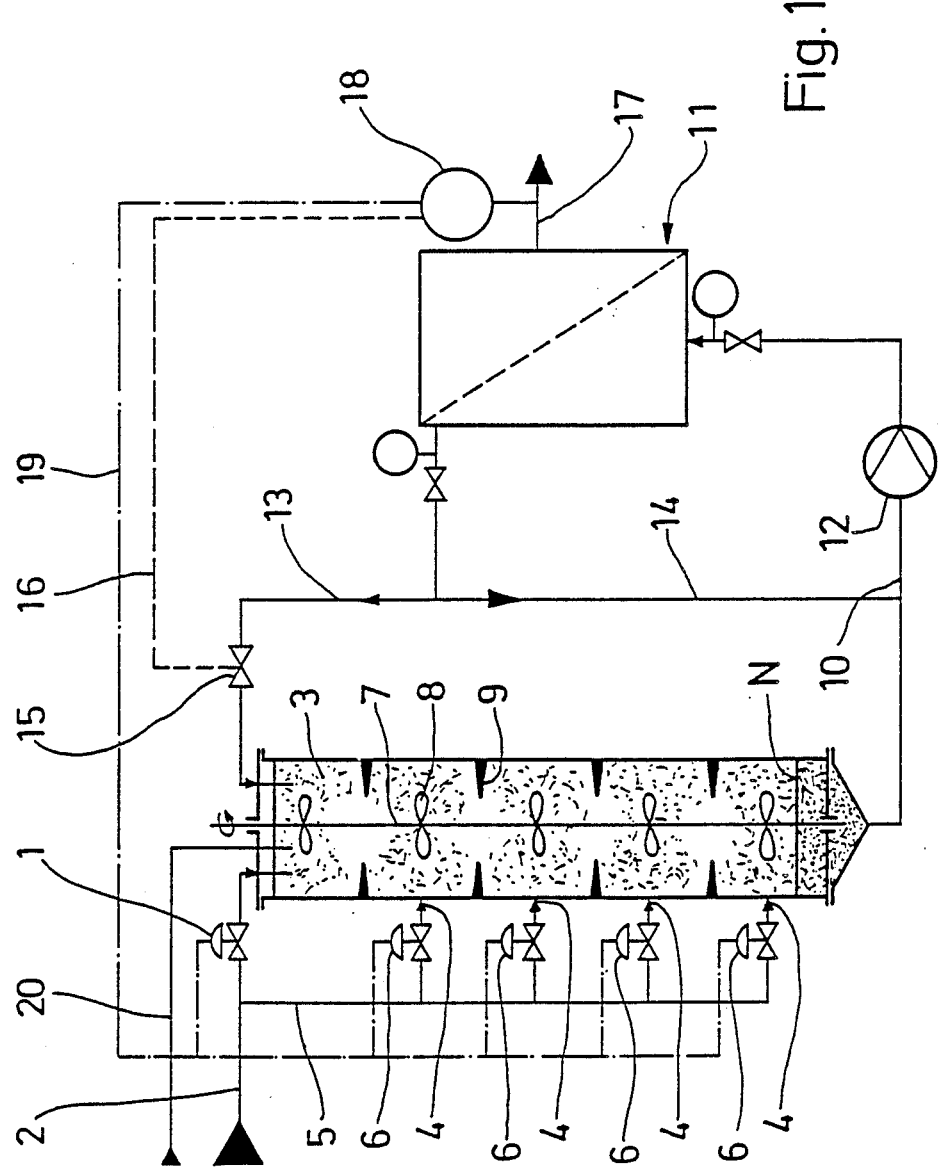

United States Patent [19]

Gresch

[11] Patent Number: 4,975,297

[45] Date of Patent: Dec. 4, 1990

[54] PROCESS FOR AFTERTREATMENT OF LIQUIDS, IN PARTICULAR CLARIFIED JUICE, AND UNIT FOR PERFORMING THE PROCESS

[75] Inventor: Walter Gresch, Niederweningen, Switzerland

[73] Assignee: Bucher-Guyer AG Maschinenfabrik, Niederweningen, Switzerland

[21] Appl. No.: 342,531

[22] PCT Filed: Jun. 21, 1988

[86] PCT No.: PCT/CH88/00111

§ 371 Date: Feb. 28, 1989

§ 102(e) Date: Feb. 28, 1989

[87] PCT Pub. No.: WO89/00013

PCT Pub. Date: Jan. 12, 1989

[30] Foreign Application Priority Data

Jun. 29, 1987 [CH] Switzerland ............ 2452/87

[51] Int. Cl.$^5$ ............................................. A23L 2/30
[52] U.S. Cl. .................................. 426/495; 426/300.5; 426/422; 210/615; 210/798
[58] Field of Search ................... 426/330.5, 422, 495; 210/798, 615

[56] References Cited

U.S. PATENT DOCUMENTS

| | | | |
|---|---|---|---|
| 2,423,172 | 6/1947 | Booth | 210/798 |
| 4,631,193 | 12/1986 | Sobus | 426/384 |
| 4,724,080 | 2/1988 | Dau et al. | 426/330.4 |
| 4,746,441 | 5/1988 | Yagishita et al. | 210/798 |

Primary Examiner—Donald E. Czaja
Assistant Examiner—Helen Pratt
Attorney, Agent, or Firm—Edmund M. Jaskiewica

[57] ABSTRACT

For aftertreatment of clarified juices, the juice is brought into contact with an agent, e.g., PVPP, and is filtered in a crossflow filtration device (11) and the aftertreated juice is separated as permeate from the agent. The agent can be regenerated by the addition of water and lye either inside or outside the unit. After regeneration, the lye is again flushed out by diafiltration on the permeate side of crossflow filtration device (11). With the aid of crossflow filtration, the economic efficiency and the universal applicability with respect to the use of agents of the unit can be considerably increased and the treatment quality of the juice can be improved.

12 Claims, 2 Drawing Sheets

PROCESS FOR AFTERTREATMENT OF LIQUIDS, IN PARTICULAR CLARIFIED JUICE, AND UNIT FOR PERFORMING THE PROCESS

The invention relates to a process for aftertreatment of at least partially clarified liquids, in particular clarified juices of fruits, berries or vegetables, in each case with an agent to prevent subsequent clouding and/or for color lightening, and the juice is brought into contact with the agent and the agent is retained by a filter.

In some cases, a subsequent clouding of the juice occurs after clarifying juice, especially during clarification by ultra-or micro-filtration, after a certain storage time and under certain conditions, for example after concentration. To prevent this, in practice the treatment of the juice with an agent, the so-called PVPP (polyvinylpolypyrrolidone), which is able to bond selectively the polyphenols that cause subsequent clouding, has proven itself very reliable. PVPP is a fine powder that is added at a concentration of, for example, 10–100 gr/HL to the juice to be aftertreated and, after a retention time of, e.g., about 5 minutes, is again filtered out of the juice, which afterwards is clouding-stable. Since PVPP is relatively expensive, units are mainly used in which the PVPP can be recovered. The same treatment is also used if a lightening of the juice is desired.

A known process for aftertreatment of clarified juice consists in that to the clarified juice that is delivered from an ultra-, micro- or conventional filtering unit there is added the agent PVPP and the mixture of clarified juice and PVPP flows through a precoated filter. With the aid of a dosing device, the PVPP concentration in the juice is adjusted. Inside the precoated filter, the suspended PVPP is retained by the filter surfaces, so that the exiting juice is free of PVPP. Another filtration of the juice occurs by another filter which, for safety reasons, is connected downstream from the precoated filter and ensures that no more PVPP is contained in the juice. As time goes by the filter cake consisting of PVPP keeps on getting thicker on the precoated filter. The throughput becomes correspondingly smaller until the unit must be shut off. After shutting off the juice feed, so-called wash water and lye flow through the deposited PVPP or the filter cake. The relatively expensive PVPP is regenerated by the lye and, by dissolving the filter cake and bringing it into the dosing device, it can be used again.

The suspended form of pulverulent agents such as, e.g., PVPP, activated carbon or fining agents such as bentonite, etc., in the juice, offer ideal conditions for a good mass transfer between juice and agent to remove undesired matter from the juice, for example by adsorption on the agent, as well as for the operation of the process.

But the known process of precoated filtration has the drawback that the suspended agent is deposited relatively quickly on the filter surfaces by the static filtration and a precoat layer forms. The result of this is a lesser effectiveness of the PVPP, which is now present in the form of a so-called fixed bed that is relatively thin and is quickly flowed through. The matter responsible for clouding the juice is thus often not broken down sufficiently with the concentrations for, e.g., PVPP to some extent allowed by law. Further, the growing filter layer causes a correspondingly increasing reduction of the throughput. Another drawback consists in the fact that only agents can be used which, because of their structure, generate a relatively well permeable filter precoating and thus guarantee an economical throughput. This is achieved with a special PVPP agent, but which is considerably more expensive than the normal PVPP that is already expensive in itself. This also causes increased operating costs, since the loss of agent during regeneration is about 1–2%. Further, it is a drawback that the process must be interrupted independently of the throughput as soon as the filter layer has reached a certain size, which is given by the distances between the filter elements. The higher the concentration of the suspension, the faster this state is reached. Further, the PVPP regeneration requires relatively many operations. With untrained operating personnel, an expensive automation of the work cycle can thus become necessary. With the precoated filtration process, no aftertreatment with soluble agents, e.g., with enzymes, can be performed either.

In another known embodiment for aftertreatment of juice, layers containing PVPP are built into a so-called sheet filter. Juice flows through these sheets and is treated with PVPP this way. The contact time of the juice and the agent is short in this case. Because of this, relatively large apparatuses and a frequent regeneration of the agent are necessary. Further, only use of regenerated pretreatment agents is suitable considering the expense. Soluble aftertreatment agents are also not usable.

The object of the invention is to provide a process and a unit for aftertreatment of clarified juice by which, with reduced investment costs, the throughput and economic efficiency of the unit are increased and the quality of the treatment is improved. This object is achieved according to the invention in that the mixture of juice and agent is filtered in the crossflow filtration process.

Other advantageous and suitable embodiments of the invention are to be gathered from the claims.

The advantages achieved with the invention consist especially in that by the crossflow filtration, because of a dynamic filtration, the formation of a precoat layer on the filter surfaces that reduces the throughput and the effect of the agent is prevented. In this way, the economic efficiency of the unit is increased. The unit works with suitable filter selection practically loss-free, as long as a regeneration of the agent is possible. The activity of the agent can be balanced by varying and controllable retention times in the juice. With the aid of crossflow filtration, a simple concentration of the agent-suspension or solution is possible for regenerating the agent by which, despite the suspended or dissolved form of the agent, the regeneration time and the necessary amount of regeneration agent can be kept in economically feasible limits. Further, a universal use of various agents is possible. Besides PVPP, other pulverulent agents such as, e.g., bentonite, activated carbon, etc., can be used.

Figure 2:
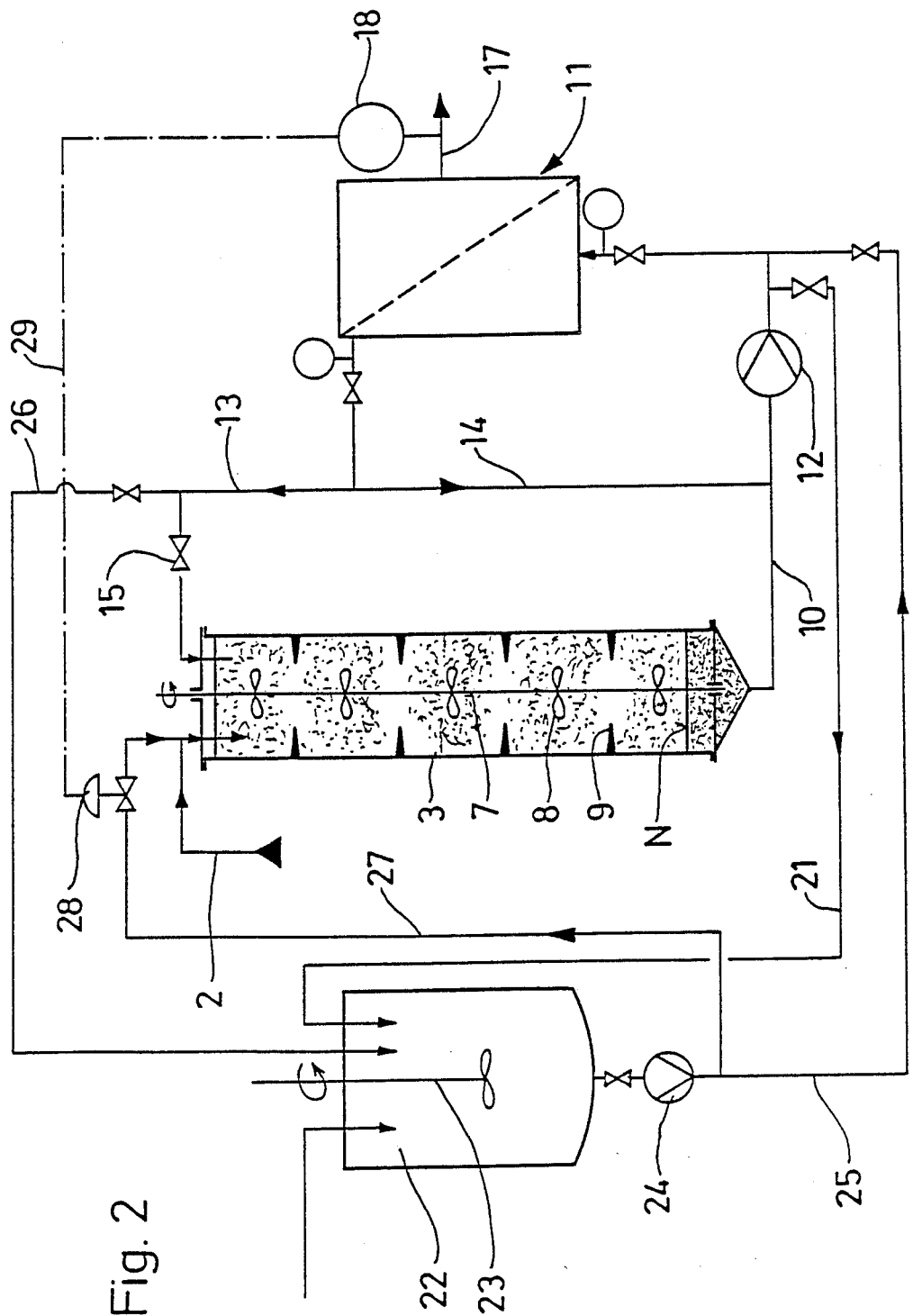

The invention is explained in more detail in the following description and the drawing, which represents various embodiments. There are shown in:

FIG. 1, a diagrammatic representation of the unit with regeneration of the agent inside the unit and FIG. 2, the unit according to FIG. 1 with regeneration outside the unit.

As can be seen from FIG. 1, the juice to be aftertreated is introduced by a feed line 2, which can be shut by a valve 1, into an initial tank 3. Initial tank 3 is made column-shaped in the vertical direction and exhibits several charging points 4 through which the juice can selectively be introduced into initial tank 3. For this purpose, there branches off from feed line 2 a line 5 which, by shutoff valves 6, leads to various charging points 4 of initial tank 3. An agitator 7 with several agitating propellers 8 and stator components 9 is placed in initial tank 3.

From the bottom end of initial tank 3, a line 10 leads to a crossflow filtration device 11, which can consist of an ultra-, micro- or coarse filtration unit. A circulating pump 12 is connected in line 10. A return line 13 leads from crossflow filtration device 11 back to initial tank 3. Line 10, crossflow filtration device 11, return line 13 and initial tank 3 constitute the retentate-side circuit. By a connection line 14 between return line 13 and line 10, a part of the retentate can be fed directly back into line 10 while circumventing initial tank 3. The amount of diverted retentate can be controlled by a regulating valve 15, which is connected by a control line 16 to a color regulator placed in discharge line 17 for the permeate or to a regulator for a process variable 18 influenced by the treatment. Another control line 19 leads from color regulator 18 to shutoff valves 6 for controlling the feed of fresh juice into initial tank 3 to control the duration of the treatment.

The fresh juice delivered from an ultra- or micro-filtration device is introduced by feed line 2 into initial tank 3 and, with the aid of circulating pump 12, is conveyed through crossflow filtration device 11. In this way, the juice is brought into contact with the agent, for example PVPP, of which a dosed amount is added in advance to the retentate-side circuit. The polyphenols present in the juice that cause subsequent clouding are bonded by the PVPP, so that the juice aftertreated this way, which is separated from the agent on the filter surface of the crossflow filtration device, leaves crossflow filtration device 11 on the permeate side through discharge line 17 clouding-stable. Because of the crossflow filter principle, the agent remains in the retentate-side circuit in suspension or in solution with soluble agents. The column-shaped structure of initial tank 3 causes new juice, after its entrance into the initial tank only after a certain retention time during which the agent can act, to reach the filtration surface of crossflow filter device 11. By agitator propellers 8 and stator components 9 or, e.g., by the installation of static mixing elements, a good intermixing of juice and agent as well as a narrow retention time spectrum for the juice flowing through is achieved. This improves the quality of the treatment and further reduces the necessary concentration of agent with respect to offering the possibility of using a smaller tank.

The intensity of the treatment of the juice with PVPP can be regulated by changing the retention time of the juice in the unit or by influencing the turbulence in initial tank 3 caused by the agitator speed and the circulating amount. For a shorter retention time, for example to introduce fresh juice into initial tank 3, a charging point 4 lying further below is selected by opening associated shutoff valve 6. An automatic control of shutoff valve 6 occurs by regulator 18. Another possibility of influencing the retention time is made possible by regulating valve 15, which is also connected to color regulator 18 and controls the return flow amount of the retentate to initial tank 3 depending on the color value of the juice exiting on the permeate side. The regulation of the retention time can also be performed depending on the time of the prefiltered juice amount or on another, characterizing process variable.

To be able to use again the relatively expensive agent after adsorption of the undesired matter from the juice, it must be subjected to a regeneration treatment with lye. For this, the juice feed to initial tank 3 is shut off and, by introducing water into the retentate-side circuit, the remaining juice is flushed out and the mixture of water and agent is concentrated. This results in a reduction of the volume to be regenerated and thus also a reduction in the amount of regeneration agent necessary. Further, the regeneration time is also shortened and thus the economic efficiency is increased. After introducing lye into the remaining volume of the retentate-side circuit, regeneration of the agent is performed by preferably recirculating the contents of initial tank 3 through crossflow filtration unit 11 by circulating pump 12. Here the liquid level in initial tank 3 has level N. After completion of the regeneration step the lye feed is shut off and the unit is washed thoroughly by the introduction of backwash water by feed line 20 into the retentate-side circuit and cleaned of lye. After this, fresh juice can again be introduced by feed line 2 and the treatment of the juice with the regenerated PVPP can be continued.

FIG. 2 represents an embodiment in which the regeneration of the agent occurs outside the unit. This type of regeneration is suitable if, for example, relatively high chemical concentrations are necessary for the regeneration and/or an influencing of the treatment intensity also by changing the agent concentration is necessary. The same applies for the case of higher temperatures that are harmful for certain types of membranes of crossflow filtration unit 11, for example consisting of plastic. To avoid these drawbacks, preferably the solution of water and agent concentrated in advance in the retentate-side circuit is pumped from circulating pump 12 through a line 21 from the retentate-side circuit into a regeneration tank 22 outside the unit. For chemical treatment and regeneration of the PVPP, lye is fed to regeneration tank 22 and thoroughly mixed with the aid of an agitator 23. After a certain retention time, the regeneration of the agent is finished, so that the lye contained in the mixture can again be removed. For this purpose, after cooling and dilution by backwash water, the mixture is pumped from regeneration tank 22 preferably with the aid of a circulating pump 24 through a line 25 into crossflow filtration device 11 and is washed by diafiltration or a similar process, so that the lye can exit through discharge line 17 on the permeate side of crossflow filtration device 11. The remaining mixture consisting of backwash water and agent is again fed back by return line 13 of the retentate-side circuit into initial tank 3 or by another line 26 branched from return line 13 into regeneration tank 22. From regeneration tank 22, the regenerated and washed agent is introduced by a line 27 into initial tank 3 and thus into the retentate-side circuit. Simultaneously, the juice feed can be initiated by feed line 2, so that a new process for aftertreatment of the juice can occur.

The regulation of the treatment duration of the juice already described in the embodiment according to FIG. 1 can be supplemented in the embodiment according to FIG. 2 in that simultaneously with the feed of fresh juice, a gradual or regulated addition of regenerated agent occurs from regeneration tank 22 by line 27 into initial tank 3. In line 27 a regulating valve 28 is placed, which can be controlled by a line 29 from regulator 18.

With the use of inexpensive agents or with use in very low concentrations, a regeneration of the agent can optionally be dispensed with. With agents that cannot be regenerated the regeneration is eliminated anyway.

The process and the unit according to the invention are suitable not only for stabilizing clear juices of fruits, berries and vegetables, but can also be used for other liquids to be aftertreated such as wine, beer and the like, as well as for lightening liquids.

I claim:

1. Process for aftertreatment of at least partially clarified liquids, in particular clarified juices of fruits, berries or vegetables to prevent subsequent clouding and/or for color lightening the steps comprising bringing a partially clarified/juice into contact with a clarifying agent to form a mixture of juice and clarifying agent, and subjecting the mixture of juice and clarifying agent to a crossflow filtration process such that the clarifying agent is retained on one side of a filter and the juice is separated through another side of the filter from the retained clarifying agent.

2. Process according to claim 1, wherein the crossflow filtration is performed by coarse filtration, microfiltration or ultrafiltration.

3. Process according to claim 1 or 2, wherein the juice is kept in contact with the agent for a predetermined retention time.

4. Process according to claim 3, wherein the retention time is varied whereby the treatment intensity is changed.

5. Process according to claim 4, wherein the time and/or amount of juice treated is varied whereby the treatment intensity is controlled.

6. Process according to claim 4 or 5, wherein the treatment intensity resulting from treatment duration and/or agent concentration and/or turbulence in an initial tank is controlled in response to the color value or another predetermined treatment-influenced process variable of the juice exiting on the permeate side after crossflow filtration.

7. Process according to claim 2 wherein the intensity can be changed by a gradual and/or controllable clarifying agent is gradually and selectively added to the retentate-side circuit to change the treatment intensity.

8. Process according to claim 2 and the steps of cutting off the juice feed, adding water to the retentate-side circuit such that this circuit is thoroughly washed, concentrating the mixture of juice and clarifying agent in the diafiltration or a similar process and feeding a regeneration agent to the retentate-side circuit to regenerate the clarifying agent.

9. Process according to claim 8, wherein after regeneration of the agent, the retentate-side circuit is washed out by the addition of backwash water in the diafiltration or a similar process.

10. Process according to claim 9, wherein at least the regeneration of the clarifying agent is performed outside, and the flushing and washing are performed inside or outside the retentate-side circuit.

11. Process according to claim 1 wherein the clarifying agent comprises a pulverulent agent which bonds with polyphenols in the partially clarified juice.

12. Process according to claim 11 wherein said agent comprises polyvinylpolypyrrolidone.

* * * * *